US011216479B2

(12) United States Patent
Mukherjee et al.

(10) Patent No.: US 11,216,479 B2
(45) Date of Patent: Jan. 4, 2022

(54) DATA ELEMENT VISUALIZATION INTERFACE

(71) Applicant: Oracle International Corporation, Redwood Shores, CA (US)

(72) Inventors: Prasun Mukherjee, Kolkata (IN); Jeevan Selvan Job John, Karnatak (IN); Pravas Sudhakar Naik Bhagat, Bangalore, IN (US); Srilakshmi Ramachandra, Karnataka (IN); Tarun Kumar, Uttar Pradesh (IN); Walter Duell, Neubiber (DE)

(73) Assignee: Oracle International Corporation, Redwood Shores, CA (US)

( * ) Notice: Subject to any disclaimer, the term of this patent is extended or adjusted under 35 U.S.C. 154(b) by 943 days.

(21) Appl. No.: 15/801,434

(22) Filed: Nov. 2, 2017

(65) Prior Publication Data

US 2018/0210929 A1    Jul. 26, 2018

(30) Foreign Application Priority Data

Jan. 21, 2017   (IN) .............................. 201741002372

(51) Int. Cl.
   *G06F 16/248*   (2019.01)
   *G06F 16/26*    (2019.01)

(52) U.S. Cl.
   CPC ............ *G06F 16/248* (2019.01); *G06F 16/26* (2019.01)

(58) Field of Classification Search
   None
   See application file for complete search history.

(56) References Cited

U.S. PATENT DOCUMENTS

| | | | |
|---|---|---|---|
| 6,499,026 B1* | 12/2002 | Rivette | G06F 16/34 |
| 9,424,333 B1* | 8/2016 | Bisignani | G06F 40/186 |
| 9,626,080 B1* | 4/2017 | Labaj | G06F 3/00 |
| 2008/0147605 A1* | 6/2008 | Bensalah | G06F 16/86 |
| 2016/0342582 A1* | 11/2016 | Hiatt | G06F 16/285 |
| 2017/0315683 A1* | 11/2017 | Boucher | G06F 16/2228 |
| 2019/0324989 A1* | 10/2019 | Borochoff | G06F 9/5011 |
| 2020/0104402 A1* | 4/2020 | Burnett | G06F 16/243 |

* cited by examiner

*Primary Examiner* — James Trujillo
*Assistant Examiner* — Kurt A Mueller
(74) *Attorney, Agent, or Firm* — Invoke

(57) ABSTRACT

Techniques for visualizing data elements are disclosed. A system presents a first data element profile comprising: a first data element; a second data element; and a first formula used to calculate a value of the first data element using a value of the second data element. The system detects user input selecting the second data element. Based on detecting the user input, the system presents a second data element profile comprising: the second data element; a third data element; and a second formula used to calculate a value of the second data element using a value of the third data element. The system detects user input selecting the third data element. Based on detecting the user input, the system presents a third data element profile comprising the third data element.

21 Claims, 15 Drawing Sheets

DATA ELEMENT VISUALIZATION INTERFACE

This application claims the benefit of India Provisional Patent Application Number 201741002372, filed Jan. 21, 2017, titled "Data Element Drill Down Interface," which is hereby incorporated by reference. The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to an interface for presenting information about data elements. In particular, the present disclosure relates to an interface for identifying relationships between data elements.

BACKGROUND

Many different types of computer systems involve managing data. A computer system, or a subsystem thereof, that manages data may be referred to as a data management system. A typical data management system manages multiple different data elements. The data management system may maintain, modify, delete, and/or otherwise manipulate the values of data elements. As an example, a payroll management system may manage data elements corresponding respectively to employees' base salary compensation, bonuses, sales, health insurance benefits, stock awards, overtime pay, deductions, garnishments, total compensation, etc. These data elements may be thought of, collectively, as an employee's payroll record. The payroll management system includes functionality to maintain, modify, delete, and/or otherwise manipulate employee payroll records.

Data elements managed by a data management system may be related in various ways. A data management system may use a first data element to generate a second data element. In an example, a data management system determines a value of the second data element based on conditional logic. The data management system uses a value of the first data element as input to the conditional logic. In another example, a data management system determines a value of the second data element based on a formula. The data management system uses a value of the first data element as input to the formula. The data management system may use the second data element to generate a third data element. In general, a particular data element may be related to one or more other data elements via a logical tree or hierarchy of data element relationships.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid Unnecessarily Obscuring the Present Invention.

1. General Overview
2. Architectural Overview
3. Presenting Data Element Relationships
4. Presenting a Dependency Graph
5. Data Element Groupings
6. Miscellaneous; Extensions
7. Hardware Overview
8. Computer Networks and Cloud Networks
9. Microservice Applications 1. General Overview One or more embodiments include techniques for visualizing data elements. A system presents a first data element profile comprising: a first data element; a second data element; and a first formula used to calculate a value of the first data element using a value of the second data element. The system detects user input selecting the second data element. Based on detecting the user input, the system presents a second data element profile comprising: the second data element; a third data element; and a second formula used to calculate a value of the second data element using a value of the third data element. The system detects user input selecting the third data element. Based on detecting the user input, the system presents a third data element profile comprising the third data element.

One or more embodiments include techniques for displaying a dependency graph of data elements. A system determines that an application is configured to calculate, based on a first formula, a value of a first data element using a value of a second data element. The system determines that the application is configured to calculate, based on a second formula, a value of the second data element using a value of a third data element. The system presents a dependency graph comprising: a first visual representation of the first data element; a second visual representation of the second data element; a third visual representation of the third data element; a first connector, based on the first formula, indicating a first dependency of the first data element on the second data element; and a second connector, based on the second formula, indicating a second dependency of the second data element on the third data element.

One or more embodiments described in this Specification and/or recited in the claims may not be included in this General Overview section.

2. Architectural Overview

Figure 1:
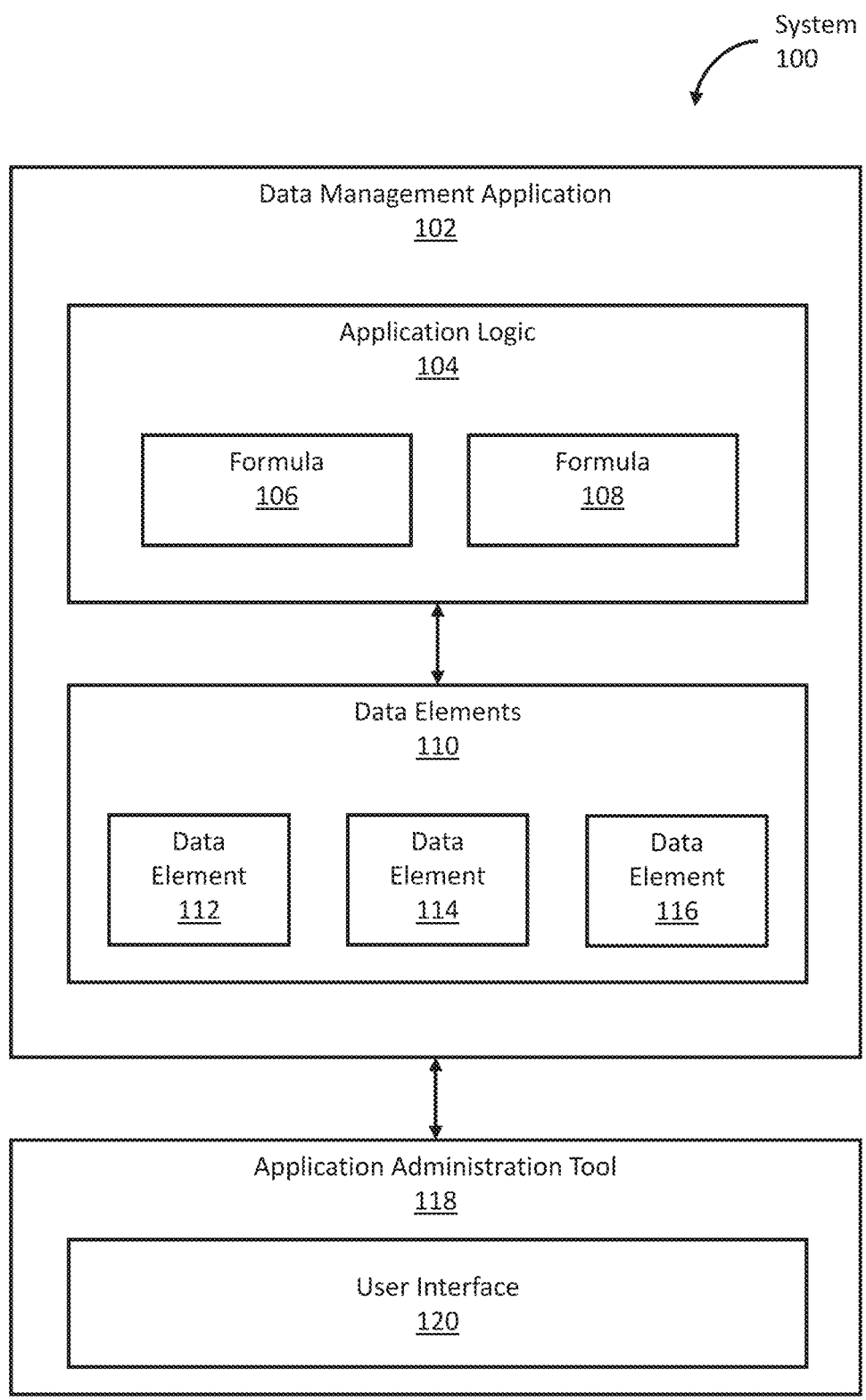
FIG. 1 is a block diagram illustrating a system according to an embodiment.

FIG. 1 is a block diagram illustrating a system 100 according to an embodiment. As illustrated in FIG. 1, system 100 includes a data management application 102, an application administration tool 118, a user interface 120, and various components thereof. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component. Additional embodiments and/or examples relating to computer networks are described below in the section titled "Computer Networks and Cloud Networks."

In an embodiment, a data management application 102 refers to hardware and/or software configured to perform operations described herein for managing data elements 110 and values of data elements 110. Specifically, the data management application 102 includes application logic 104 used to maintain, modify, delete, and/or otherwise manipulate data elements 110 and the values of data elements 110. The application logic 104 includes formulas (e.g., formula 106 and formula 108) used to generate values of data elements 110. A formula 106 may include many different types of logic and/or calculations. Specifically, a formula may receive the values of one or more data elements 110 as input and, based on logic and/or calculations, generate the values of one or more data elements 110 as output. In other words, a formula 106 specifies the computation(s) to be applied to the values of a set of one or more data elements 110 to generate a value of a target data element. A formula 106 may include addition, subtraction, multiplication, division, if/then statements, table lookups, recursion, and/or any other type of logic or calculations, or any combination thereof. As discussed in further detail below, the output of one formula may be used as input to another formula, and so on. In an embodiment, the data management application 102 is a payroll application. Alternatively, the data management application 102 may be another type of application, such as a customer relationship management (CRM) application, social media application, finance application, customer support application, or any other type of application used to manage multiple data elements.

In an embodiment, data elements 110 include multiple data elements (e.g., data element 112, data element 114, data element 116), values of which the application logic 104 uses as input for formulas and/or generates as output of formulas. A data element 112 represents a type of a set of values. In an example, a data element total compensation represents employees' total compensation. A particular value of the total compensation data element represents a particular employee's total compensation. In another example, a data element net profit represents business units' or companies' net profits each year. A particular value of the total compensation data element represents a particular business unit or company's net profit in a particular year. Values of data elements 110 may be stored in a data repository (not shown). The data repository may include type of storage unit and/or device (e.g., a file system, database, collection of tables, or any other storage mechanism) for storing data. A data repository may include multiple different storage units and/or devices. The multiple different storage units and/or devices may or may not be of the same type or located at the same physical site. Further, a data repository may be implemented or may execute on the same computing system as the data management application 102. Alternatively or additionally, a data repository may be implemented or executed on a computing system separate from the data management application 102. A data repository may be communicatively coupled to the data management application 102 via a direct connection or via a network.

In an embodiment, an application administration tool 118 includes functionality to allow a user to enter input to manage data elements 110. Specifically, the application administration tool 118 includes a user interface 120 through which a user enters input to manage data elements 110. The user interface 120 may include a command line prompt, graphical user interface (GUI), and/or any other type of interface configured to receive user input for managing data elements 110.

In an embodiment, the user interface 120 allows a user to identify, visualize, and/or modify relationships between data elements. The user interface 120 displays a data element profile in response to a user's selection of a corresponding data element. A data element profile for a particular data element identifies relationships of that particular data element to other data elements. Examples of data element profiles and relationships between data elements are discussed in detail below. Alternatively or in addition, the user interface 120 may also allow a user to identify and visualize groupings of data elements 110. Examples of data element groupings are discussed below. Examples of user interfaces are discussed in detail below.

In an embodiment, the system 100 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

Figure 2:
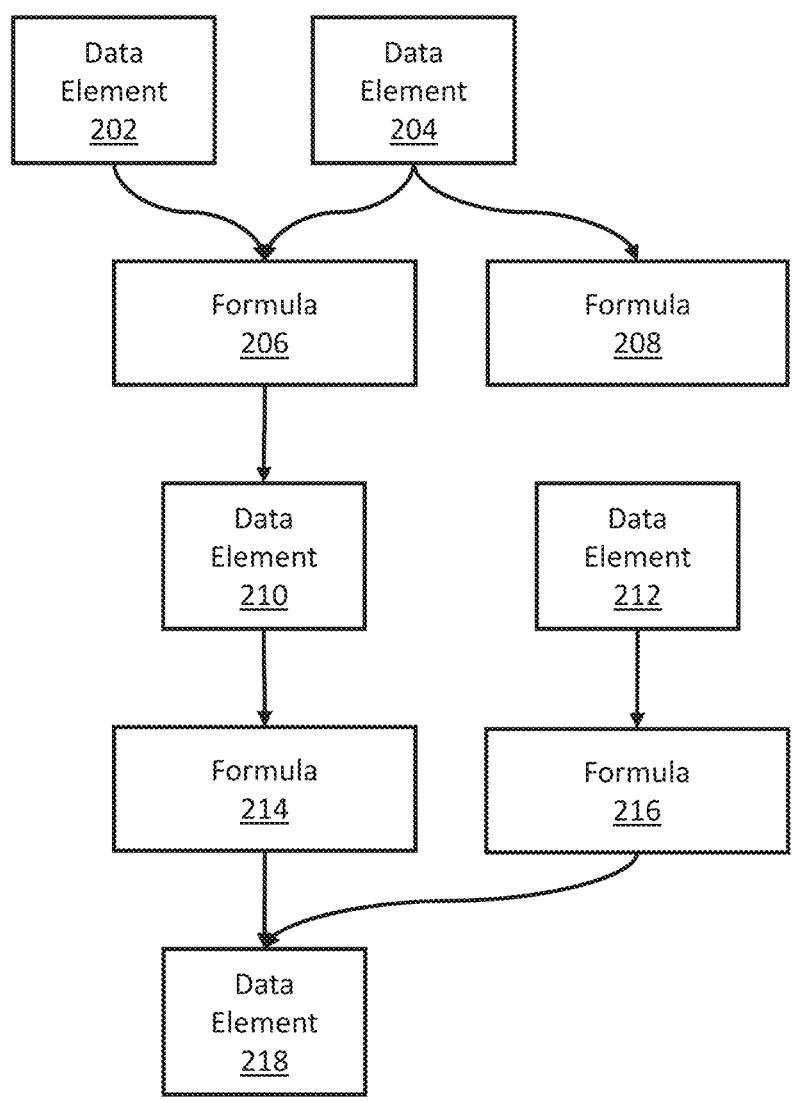
FIG. 2 is a block diagram illustrating data element relationships according to an embodiment.

FIG. 2 is a block diagram illustrating data element relationships according to an embodiment. The specific arrangement of data elements and formulas illustrated in FIG. 2 is provided for exemplary purposes only and should not be construed as limiting one or more embodiments.

In general, the relationship between a first data element and a second data element, from the perspective of the first data element, may be a "used by" or "uses" relationship. In a "used by" relationship, a value of the first data element is used to generate a value of the second data element. Specifically, the value of the first data element is used as input to a formula, and the value of the second data element is generated as output of the formula. The first data element is "used by" the second data element. In a "used by" relationship, the second data element may be considered a "dependent" of the first data element. In a "uses" relationship, a value of the first data element is generated using a value of the second data element as input. Specifically, the value of the second data element is used as input to a formula, and the value of the first data element is generated as output of the formula. The first data element "uses" the second data element. Multiple values of the same data element may be used to compute a value of another data element. As an example, an employee may sell laptops in multiple states, including Arizona and California. Two different values of a state sales data element—one value corresponding to sales in Arizona and another value corresponding to sales in California—may be used in a formula that computes a value of a total sales data element.

In a "uses" relationship, the second data element may be considered a "component" of the first data element. The "used by" and "uses" relationships may be considered reciprocal. If a first data element is a dependent of a second data element, then the second data element is a component of the first data element. If a first data element is a component of a second data element, then the second data element is a dependent of the first data element. Another type of relationship between data elements may be a "requires" relationship. In a "requires" relationship, the existence of a value of a particular data element requires a value of another data element to be defined in the data management system. As an example, a value of a social security number data element may be required for every value of an employee data element. Deleting the value of a social security number data element may be prohibited as long as the corresponding value of the employee data element remains active in the system. Any number of relationship types may be defined by a data management system. Accordingly, embodiments should not be considered limited to the specific examples of "uses," "used by," and/or "requires" relationship types.

In the example illustrated in FIG. 2, arrows indicate the directions of dependencies between data elements. Data element 202 depends on (is a "dependent" of) data element 210. Data element 210 is a component of data element 202. Formula 206 receives values of data element 210 as input and generates values of data element 202. Data element 204 also depends on data element 210. Values of data element 204 are generated using two different formulas: formula 206 and formula 208. Formula 208 does not receive any data elements as input. In turn, data element 210 depends on data element 218. Formula 214 receives values of data element 218 as input and generates values of data element 210. Data element 212 also depends on data element 128, but using a different formula 216. A data element that depends on another data element may be of the same type or of a different type as the data element on which it depends.

In general, in an embodiment, many different types of relationships between data elements may exist, using many different formulas or combinations thereof. Multiple data elements may depend on the same data element. Alternatively or in addition, two different data elements may depend on the same data element. Two different data elements may depend on the same data element using the same formula or different formulas. Alternatively or in addition, the value of a particular data element may be based on one formula or more than one formula.

Figure 3:
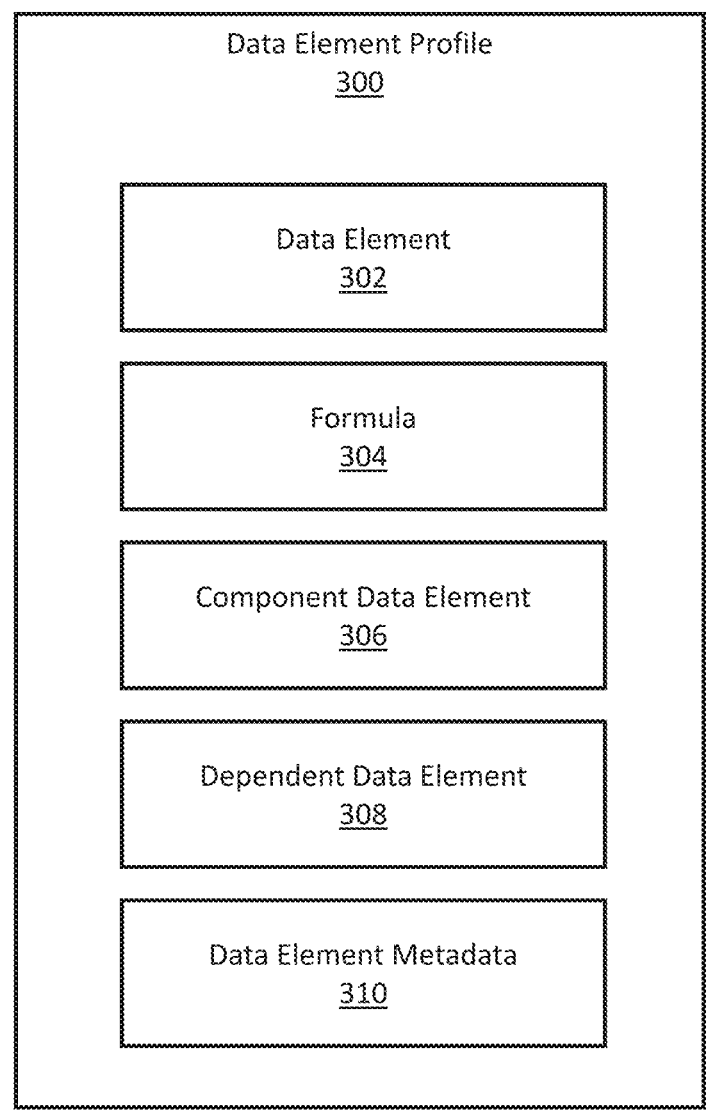
FIG. 3 is a block diagram illustrating a data element profile according to an embodiment.

FIG. 3 is a block diagram illustrating a data element profile 300 according to an embodiment. In one or more embodiments, the data element profile 300 may include more or fewer components than the components illustrated in FIG. 3.

In general, a data element profile 300 identifies a particular data element 302 and the relationships between that particular data element 302 and other data elements. A user interface, examples of which are discussed herein, may be used to identify and visualize some or all of the data in a data element profile 300. The data element profile 300 may identify one or more formulas (e.g., formula 304). A formula 304 identified by the data element profile 300 may be a formula that is used to generate values of the data element 302. Alternatively, a formula 304 may be a formula for which values of the data element 302 are used as input to generate values of other data elements. One, neither, or both of the aforementioned types of formulas may be identified in the data element profile 300. The data element profile 300 may identify one or more component data elements 306, i.e., one or more data elements whose values are used as input to a formula to generate values of the data element 302. The data element profile 300 may identify one or more dependent data elements 308, i.e., one or more data elements whose values are generated using the data element 302 as input. The data element profile 300 may include other data element metadata 310, i.e., descriptive data associated with the data element 302. Data element metadata 310 may include information about a user who created and/or last modified the data element profile 300, a date when the data element profile 300 was created, historical values of the data element 302 calculated using the formula 304, and/or any other type of descriptive data associated with the data element 302.

3. Presenting Data Element Relationships

Figure 4:
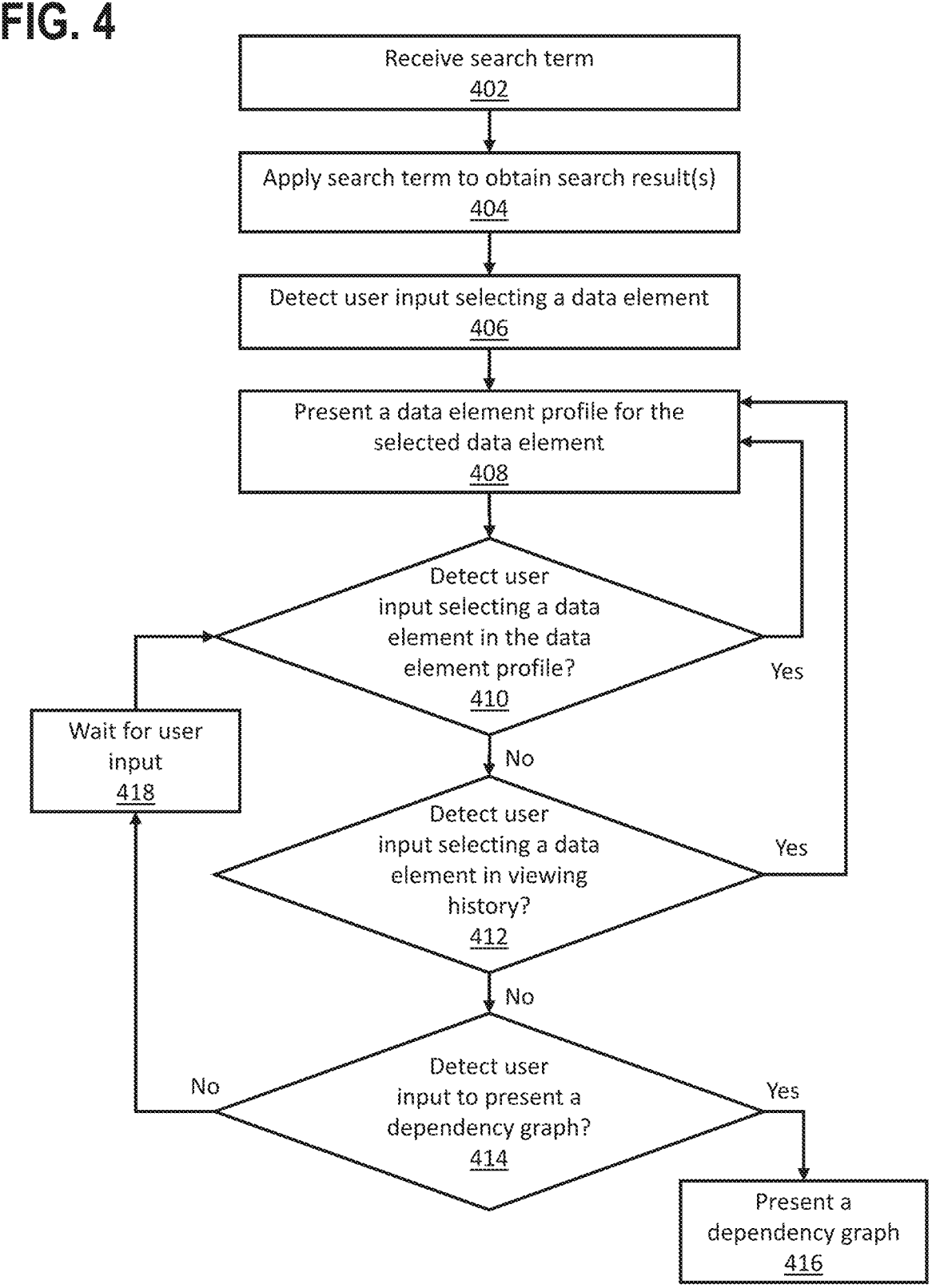
FIG. 4 illustrates an example set of operations for presenting data element relationships according to an embodiment.

FIG. 4 illustrates an example set of operations for presenting data element relationships according to an embodiment. One or more operations illustrated in FIG. 4 may be modified, rearranged, or omitted all together. Accordingly, the particular sequence of operations illustrated in FIG. 4 should not be construed as limiting the scope of one or more embodiments. The following discussion refers to a system performing various operations. Specifically, operations may be performed by a data management application and/or application administration tool such as those discussed above with respect to FIG. 1. Alternatively or in addition, one or more operations may be performed by a component other than a data management application and/or application administration tool.

In an embodiment, the system receives a search term (Operation 402). In an example, a graphical user interface (GUI) includes a search box. A user enters a search term into the search box and submits the search term using a button, enter key, or some other way of submitting a search term. The system receives the search term submitted by the user.

In an embodiment, the system applies the search term to obtain one or more search result(s) (Operation 404). A search result obtained in this manner corresponds to a data element that is associated with metadata matching the search term. A user-defined name may be assigned to a data element and stored in metadata associated with the data element. If the search term matches the name, in whole or in part, the data element is included in the search results. The search results may also include any dependent or component data elements of the data element whose name matches the search term. The search results may include multiple data elements, which may be of a same type, of different types, or a combination thereof. Alternatively or in addition, search results may include one or more data element groupings associated with metadata that matches the search term. In an example, a data element is named "Meal Allowance." The "Meal Allowance" data element belongs to a section named "Allowances." The "Allowances" section belongs to a process named "Absence." If a user submits a search term of "meal," the search results may include the "Meal Allowance" data element, the "Allowances" section, and/or the "Absence" process. Data element groupings are discussed in further detail below. To apply the search term, the system may query a repository that stores metadata associated with data elements, and receive the search result(s) in response to the query.

In an embodiment, the system detects user input selecting a data element (Operation 406). A GUI presents a list of search results, obtained as described above. One or more data elements included in the search results are selectable. Each data element may be presented as a link, referred to herein as a "data element link." The system detects that a user has selected a particular data element link.

In an embodiment, the system presents a data element profile for the selected data element (Operation 408). Specifically, system presents information from the data element profile in a user interface. The data element profile that is presented indicates relationships between the selected data element and other data elements. Specifically, the data element profile may identify the data element itself, one or more formulas associated with the data element, one or more dependent data elements, one or more component data elements, and/or any other type of metadata associated with the data element.

In an embodiment, the system determines whether user input selecting a data element in the data element profile is detected (Operation 410). If the data element profile identifies dependent and/or component data elements, those data elements may be selectable in the user interface. The system determines whether a user has selected a data element link corresponding to a dependent data element or a component data element. If the system detects user input selecting a data element in the data element profile, then the system presents a data element profile for the selected data element (Operation 408). Because this process is recursive, the system effectively allows a user to navigate a hierarchy of data element dependencies, identifying and visualizing relationships between data elements.

In an embodiment, the system determines whether user input selecting a data element in a viewing history is detected (Operation 412). Specifically, the user interface may include data element links that visually represent data elements that the user has already viewed. The viewing history may be visually arranged in a manner corresponding to the relationships between data elements. Alternatively or in addition, the viewing history may be visually arranged in the order in which a user traversed the data elements. In an example, user views a data element profile associated with a first data element. In the data element profile, the user selects a data element link corresponding to a component data element of the first data element. The user interface now presents the data element profile associated with the component data element. The user interface includes a viewing history with (1) a first data element link corresponding to the first data element and (2) a second data element link corresponding to the component data element link. The second data element link may be placed to the right of the first data element link in a "bread crumb" fashion. The application administration tool detects that a user has selected a data element link in the viewing history.

In an embodiment, the system determines whether user input to present a dependency graph is detected (Operation 414). A dependency graph is a visual representation of the relationships between multiple data elements. Dependency graphs are discussed in further detail below. If user input to present a dependency graph is detected, the system presents the dependency graph (Operation 416).

In an embodiment, if none of the aforementioned types of user input are detected, then the system waits for user input (Operation 418).

In an example, a user selects a data element total compensation by clicking on a corresponding data element link displayed by an interface. In response to the user's selection of the data element total compensation, the system identifies the formula "1.2*base compensation+performance bonus+2000." The formula is used to compute values of the data element total compensation. The system displays the formula "1.2*base compensation+performance bonus+2000" via the interface. The formula "1.2*base compensation+performance bonus+2000" includes the data elements base compensation and performance bonus. The data elements base compensation and performance bonus may be displayed as selectable data element links. A user may select the data element performance compensation, similar to the selection of the data element total compensation. In response to the selection of the data element performance compensation, the system may show a formula used to compute values of the data element performance compensation. Accordingly, the system may allow for recursive selection of data elements presented within a formula. A user may traverse through a hierarchical system of formulas, where each formula is used to compute values of a data element, and where a computed data element is used in other formula to compute values of another data element. The hierarchical system of formulas may include any number of levels. Values of each data element may be computed using a formula described in a lower level of the hierarchical system of formulas. A data element included in a formula at the lowest level in the hierarchical system of formulas may correspond to hard-coded values (e.g., user-entered values, stored values, etc.).

FIGS. 5A-5E illustrate examples of a graphical user interface (GUI) 500 according to an embodiment. The illustrations in FIGS. 5A-5E are provided as examples only and should not be construed as limiting one or more embodiments.

Figure 5A:
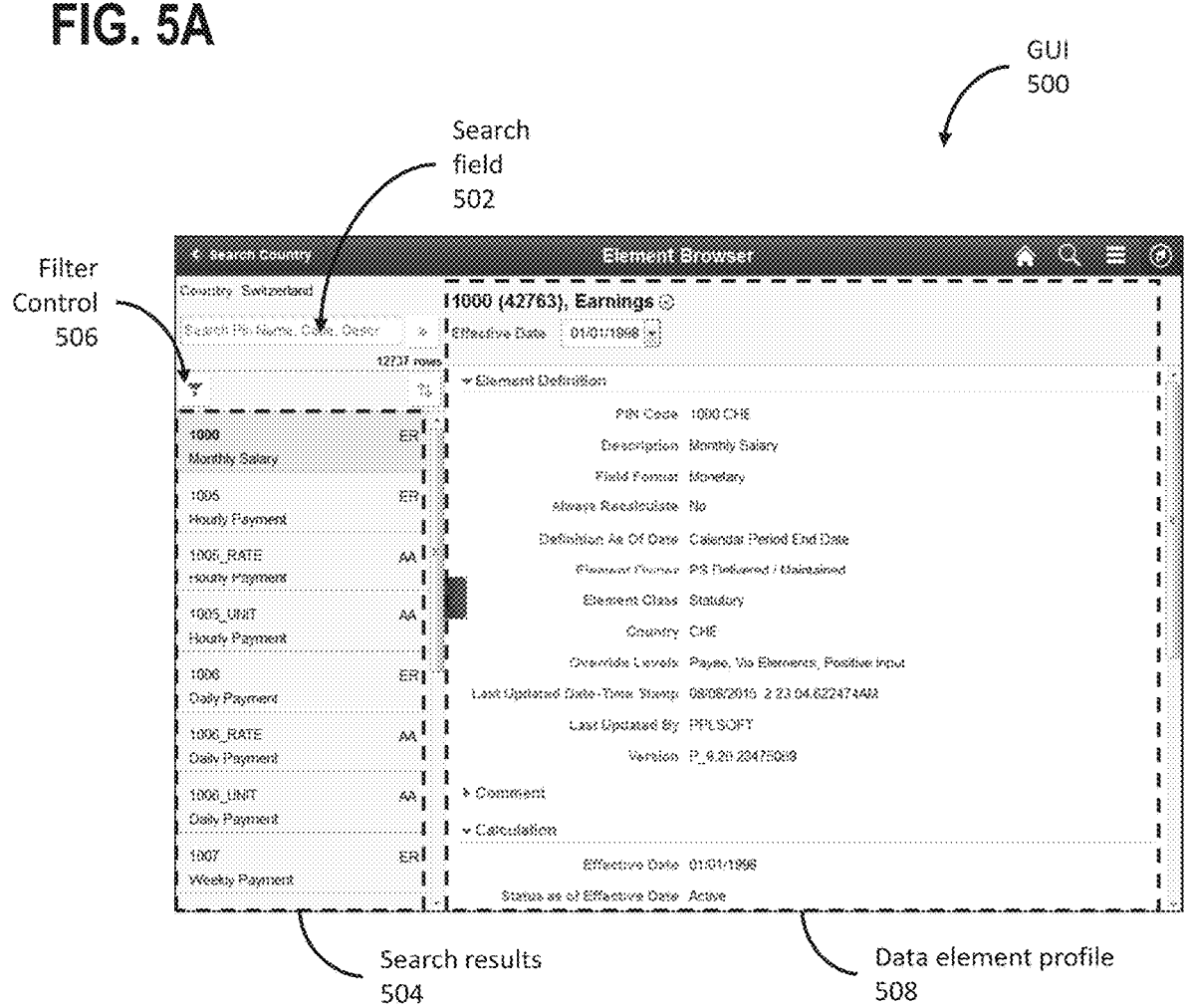
FIGS. 5A-5E illustrate examples of a graphical user interface (GUI) according to an embodiment.

As illustrated in FIG. 5A, the GUI 500 includes a search field 502. A user submits a search term using the search field 502 and the GUI 500 presents the search results 504 obtained by applying the search term. The GUI 500 includes a filter control 506 that allows a user to view only a subset of the search results. A user may use the filter control 506 to view only data elements, formulas, sections, processes, or otherwise apply any other type of filter to the search results 504. The search results 504 include data element links. When a user selects a data element link, the GUI 500 presents the corresponding data element profile 508.

Figure 5B:
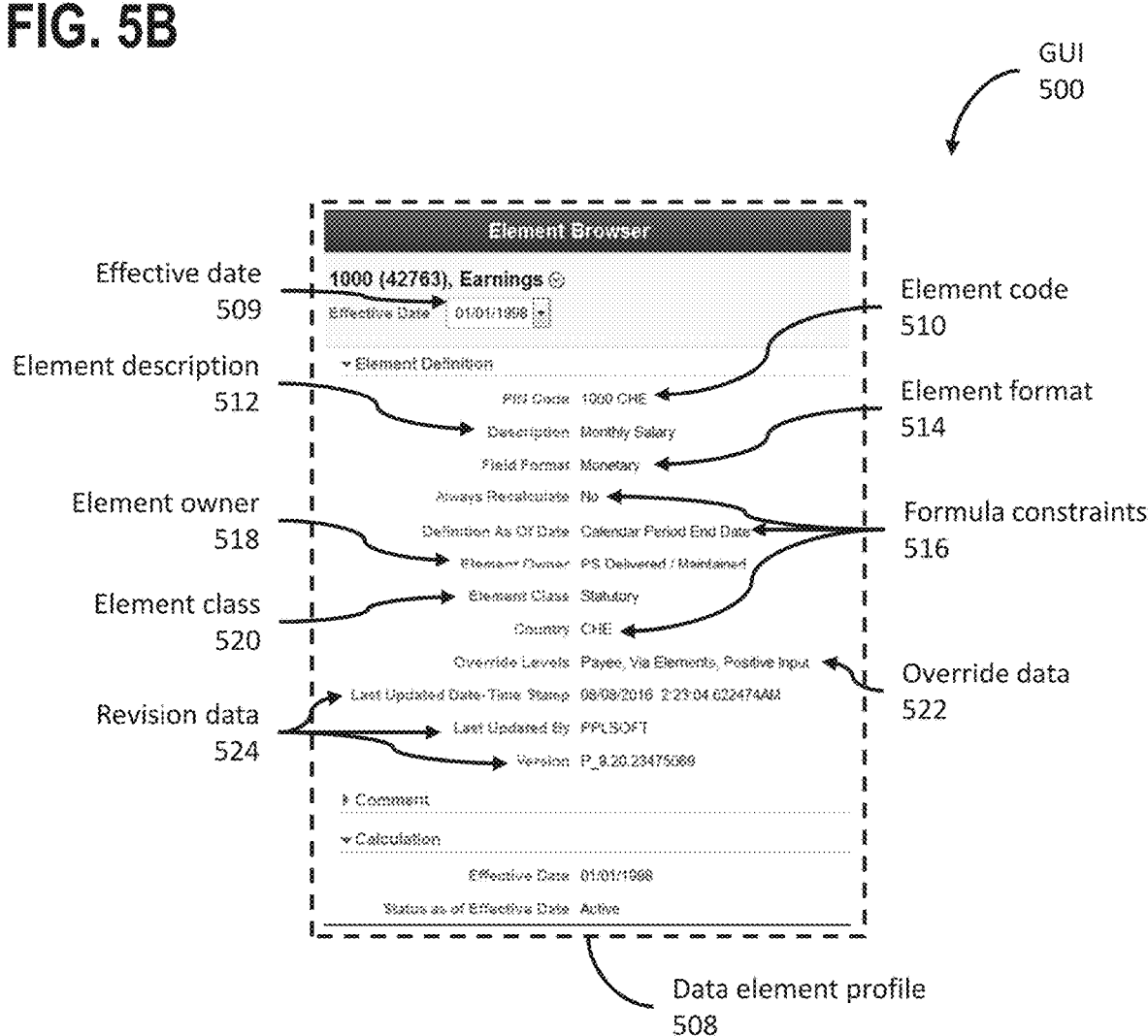

As illustrated in FIG. 5B, a data element profile 508 includes many different types of metadata associated with the data element. An effective date 509 indicates a date on which the particular data element is effective. In an example, a particular data element is calculated using a formula. The formula implements a payroll rule that should only be applied as of a particular date, such as the first day of the next fiscal year. The effective date 509 indicates that the data element should not be used before that date, or in other words will be "effective" as of that date. An element code 510 is a value that uniquely identifies the data element and that is not user-defined. The application administration tool assigns the element code 510 to the data element based on a predetermined set of naming rules. An element description 512 is user-defined and provides a natural language description of the data element. An element format 514 indicates a data type of values of the data element. Data types may include numbers, dates, currency, alphanumeric, or any other type of data type. Formula constraints 516 are logical constraints that apply to the formula(s) used to generate values of the data element. Formula constraints 516 may indicate how frequently a value should be recalculated, a data range to be used in the formula (e.g., a particular date range), and/or other conditions that must be satisfied for the formula to be used. In the example illustrated in FIG. 5B, which is from a payroll application, one formula constraint is that employee must be in the country with country code "CHE," i.e., Switzerland. An element owner 518 indicates who "delivered" the data element (i.e., supplied the data element to the data management application) and/or who is responsible for maintaining the data element on an ongoing basis. In the example illustrated in FIG. 5B, the data element is both delivered and maintained by "PS," which is an acronym for the company PeopleSoft. An element class 520 is a way of categorizing different elements. An element class 520 may be "customary" (indicating a commonly followed rule), "sample" (provided as an example only), "statutory" (associated with a legal requirement), "system" (internal data elements supporting application logic), "not classified," or any other type of categorization or combination thereof. Override data 522 indicates conditions that permit a user to override the computation(s) that would normally apply to generate the data element, to obtain a different value based on the override. Revision data 524 provides information about revisions to the data element since the time of its creation, such as when the data element was last revised, a user account that was used to revise the data element, a version number assigned to the data element, and/or any other type of information about the data element's revision history.

Figure 5C:
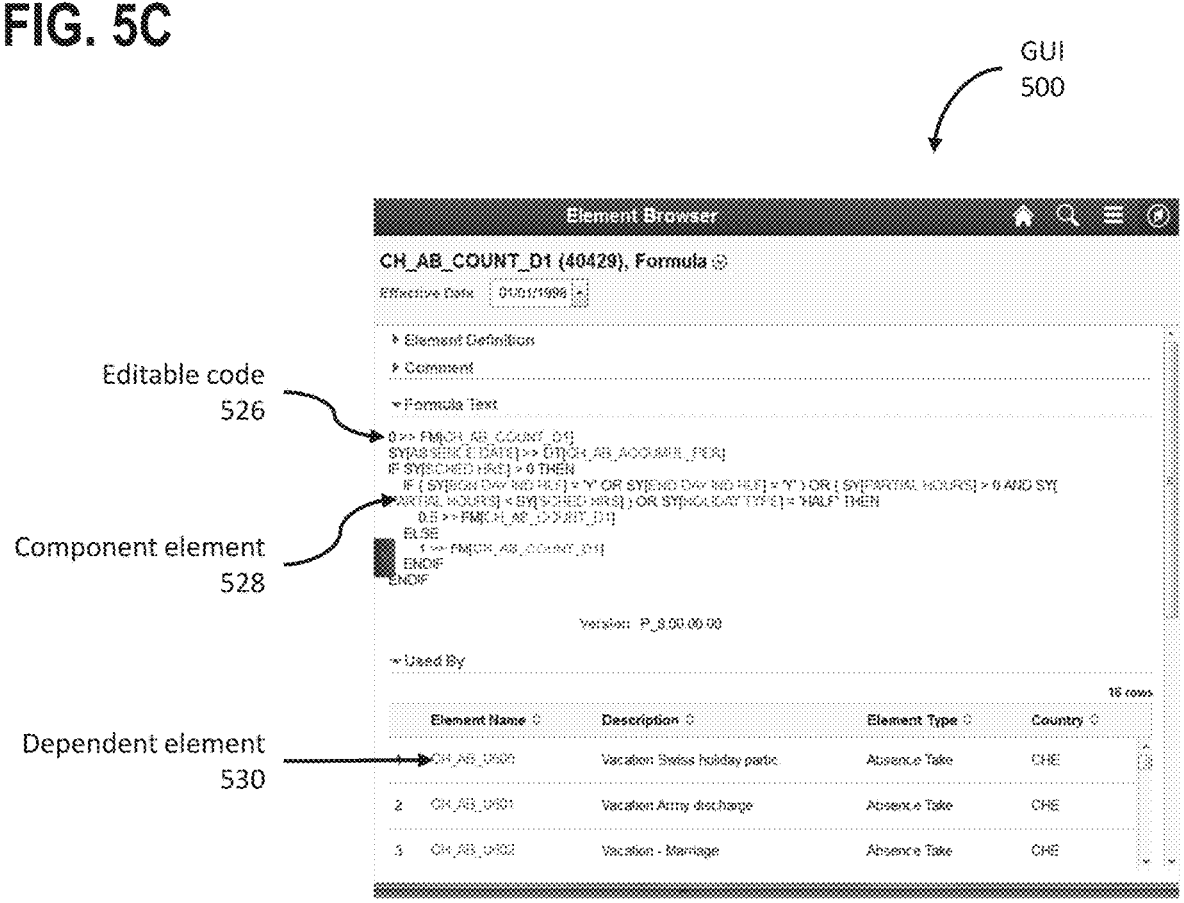

When viewing a data element profile, to the extent possible, functional terms and/or other data elements may be represented instead of the details of underlying technical formulas or algorithms. As illustrated in FIG. 5C, the GUI 500 may allow a user to visualize details regarding the formula(s) used to generate values of a particular data element. A formula may be presented as editable code 526, which a user may be able to manually edit using a predetermined code syntax. As discussed above, a formula may receive as input one or more component elements (e.g., component element 528). The GUI 500 may present the component element 528 as a data element link, which a user may select to cause the GUI 500 to present a data element profile corresponding to the component element 528. Alternatively or in addition, the GUI 500 may present one or more dependent elements (e.g., dependent element 530). In the context of viewing the details of a formula, a dependent element 530 is a data element whose value depends, in whole or in part, on output of the formula. The GUI 500 may present the dependent element 530 as a data element link, which a user may select to cause the GUI 500 to present a data element profile corresponding to the dependent element 530.

Figure 5D:
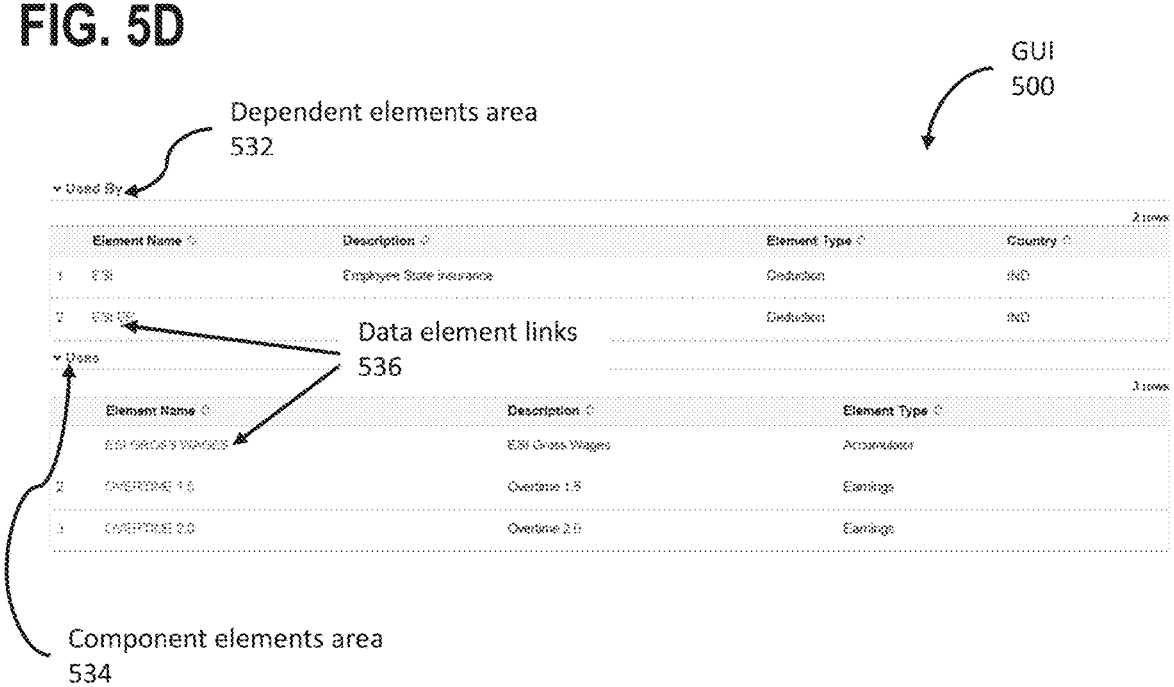

As illustrated in FIG. 5D, as part of a data element profile, the GUI 500 may include a dependent elements area 532 that lists any data elements that depend on the data element whose data element profile is being presented. In other words, the data element is "used by" all the data elements listed in the dependent elements area 532. Alternatively or in addition, as part of a data element profile, the GUI 500 may include a component elements area 534 that lists any data elements whose values are used to generate values of the data element whose data element profile is being presented. In other words, the data element "uses" all the data elements listed in the component elements area 534. Dependent elements and/or component elements may be presented as data element links 536, which a user may select to cause the GUI 500 to present a data element profile corresponding to that data element. The dependent elements area 532 and/or component elements area 534 may be presented in table form, as a drop-down list, or in any other way suitable for presenting multiple options.

A dependent elements area 532 may list one or more elements that depend indirectly on the data element whose data element profile is being presented. In an example, the data element profile of a data element x is presented. Data element y depends on data element x. Data element z depends on data element y, and therefore depends on data element x indirectly. The dependent elements area 532 for data element x may list both data element y and data element z. Alternatively or in addition, a component elements area 534 may list one or more elements that are indirect components of the data element whose data element profile is being presented. In the preceding example, the component elements area 534 for data element z may list both data element y and data element x, because data element x is a component of data element y, which in turn is a component of data element z.

Figure 5E:
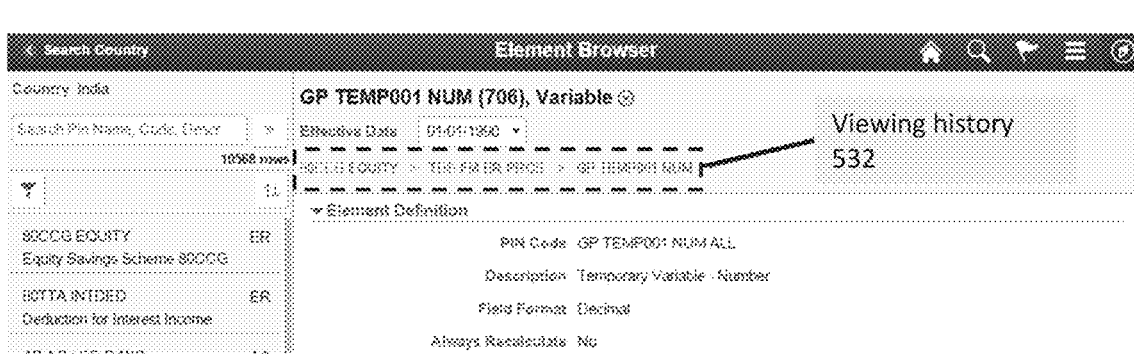

As illustrated in FIG. 5E, the GUI 500 may include a viewing history 532. A viewing history visually represents data elements that the user has already viewed. Data elements listed in the viewing history 532 may be presented as data element links, which a user may select to cause the GUI 500 to present a data element profile corresponding to that data element. Embodiments of viewing histories are discussed in further detail above.

4. Presenting a Dependency Graph

Figure 6:
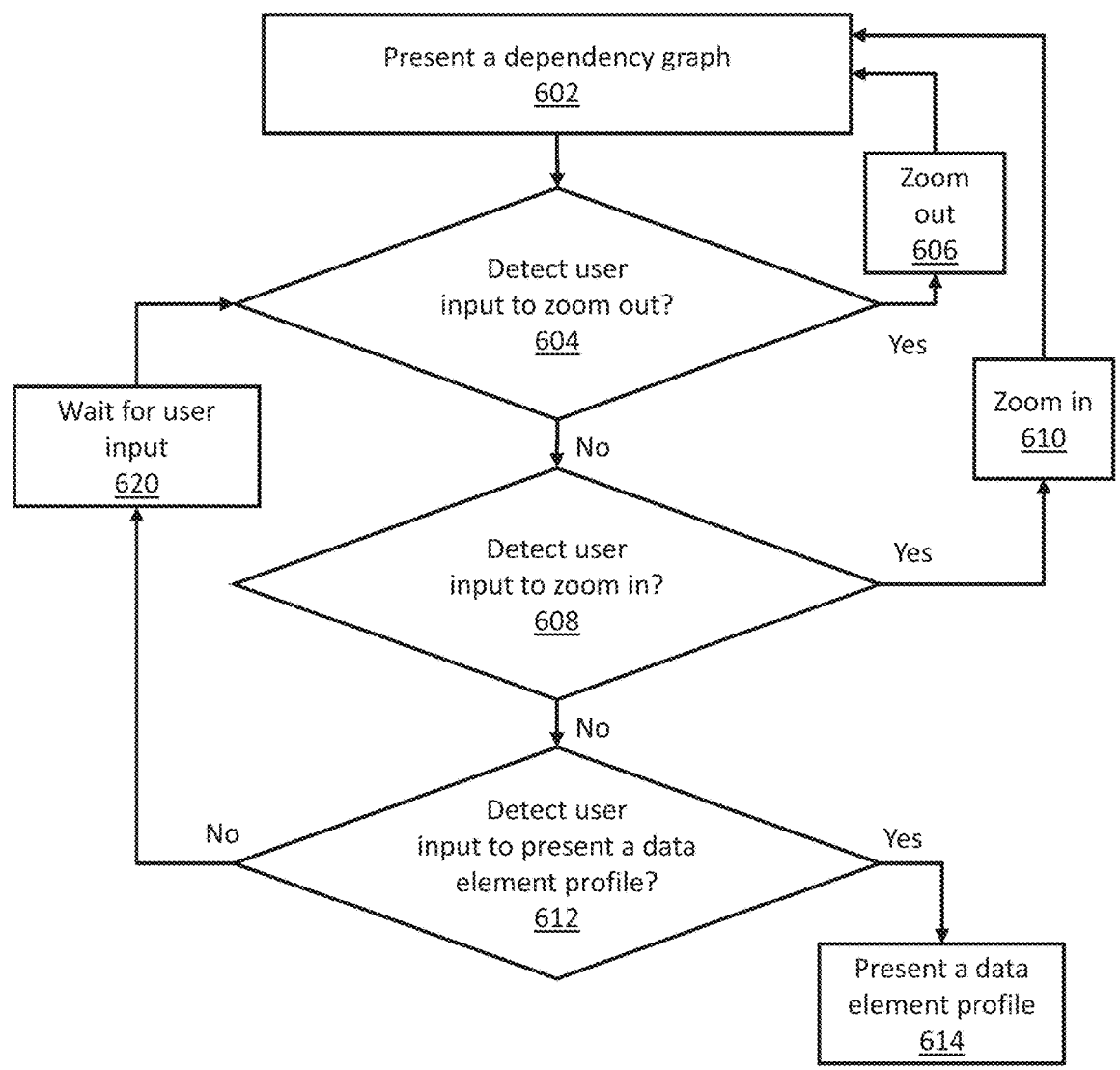
FIG. 6 illustrates an example set of operations for presenting a dependency graph according to an embodiment.

FIG. 6 illustrates an example set of operations for presenting a dependency graph according to an embodiment. One or more operations illustrated in FIG. 6 may be modified, rearranged, or omitted all together. Accordingly, the particular sequence of operations illustrated in FIG. 6 should not be construed as limiting the scope of one or more embodiments. The following discussion refers to a system performing various operations. Specifically, operations may be performed by a data management application and/or application administration tool such as those discussed above with respect to FIG. 1. Alternatively or in addition, one or more operations may be performed by a component other than a data management application and/or application administration tool.

In an embodiment, the system presents a dependency graph (602). The graph may visually represent the relationships between multiple data elements. Each data element may be represented using a corresponding icon. Different icons may be used to represent different corresponding types of data elements. In an example, data elements that are used by at least one other data element are represented using a particular icon, and data elements that are not used by any other data elements are represented using a different icon. The dependency graph may also represent data element groupings (e.g., processes and/or sections). Groupings may be represented using different icons than data elements. The dependency graph may also represent formulas that use and/or are used by data elements. Formulas may be represented using different icons than data elements and/or data element groupings. An example of a dependency graph is discussed below. The system may initially present the dependency graph at a default zoom level. The default zoom level determines how much detail to include in the dependency graph initially. The default zoom level may indicate a maximum and/or minimum number of data elements to include in the dependency graph initially, a maximum and/or minimum number of data element groupings to include in the dependency graph initially, or any other criteria or combination thereof to determine which data element(s) the system should include in the dependency graph initially. In an embodiment, the default zoom level corresponds to a visual representation of all data elements managed by the data management system. Alternatively, the default zoom level may correspond to a visual representation of a subset of the data elements.

In an embodiment, the system determines whether user input to zoom out is detected (Operation 604). In general, zooming out means presenting additional operational context for the data element(s) included in the dependency graph. Zooming out may expand the scope of data element relationships visually represented in the dependency graph and/or provide visual information about a data element grouping that includes one or more data elements presented in the dependency graph. In an example, the dependency graph visually represents relationships between three data elements. The system detects user input to zoom out. The resulting dependency graph still includes the three data elements, and also includes relationships between those three data elements and other data elements that were not visually represented in the dependency graph initially. Zooming out may provide additional operational context while reducing the amount of detail that is presented for individual data elements. Details that are lost when zooming out may include data element names and/or other metadata associated with individual data elements. User input to zoom out may take the form of a button click, rolling a scroll wheel, swiping on a trackpad, pressing a particular key on the keyboard, a voice command, or any other type of user input that the system recognizes as being associated with zooming out. If the system detects user input to zoom out, then the system zooms out (Operation 606) and presents the resulting dependency graph (Operation 602).

In an embodiment, the system determines whether user input to zoom in is detected (Operation 608). In general, zooming in means presenting additional details about one or more data element(s) included in the dependency graph. Additional details provided by zooming in may include data element names and/or other metadata associated with individual data elements. Zooming in may reduce the scope of data element relationships visually represented in the dependency graph and/or remove visual information about a data element grouping that includes one or more data elements presented in the dependency graph. In an example, the dependency graph visually represents relationships between three data elements. The dependency graph includes information about an "Earnings" section to which the three data elements belong. The dependency graph does not include the names of the three data elements. The system detects user input to zoom in. The resulting dependency graph still includes the three data elements, but (a) now includes the names of the data elements and (b) no longer includes information about the "Earnings" section. User input to zoom in may take the form of a button click, rolling a scroll wheel, swiping on a trackpad, pressing a particular key on the keyboard, a voice command, or any other type of user input that the system recognizes as being associated with zooming in. If the system detects user input to zoom in, then the system zooms in (Operation 610) and presents the resulting dependency graph (Operation 602).

In an embodiment, the system determines whether user input to present a data element profile is detected (Operation 612). A data elements in the dependency graph may be presented as a data element link, which a user may select to cause the system to present a data element profile corresponding to the selected data element. If the system detects user input to present a data element profile, then the system presents the data element profile (Operation 614). Presenting a data element profile is discussed in further detail herein.

Figure 7:
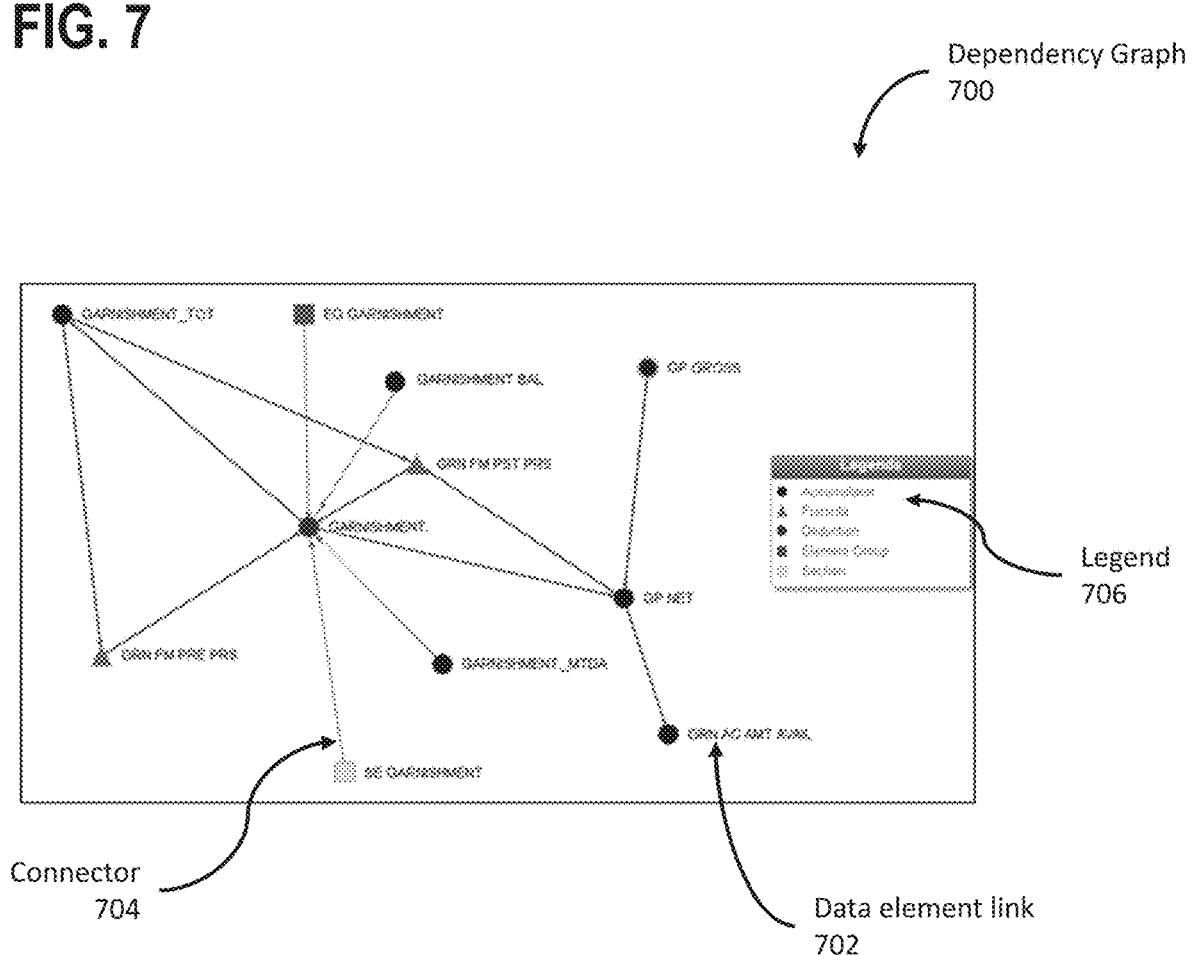
FIG. 7 illustrates an example of a dependency graph according to an embodiment.

FIG. 7 illustrates an example of a dependency graph 700 according to an embodiment. The illustration in FIG. 7 is provided as an example only and should not be construed as limiting one or more embodiments.

As illustrated in FIG. 7, the dependency graph 700 visually represents the relationships between multiple data elements. A legend 706 provides a guide to the ways in which different components of the dependency graph 700 are visually represented. In the example illustrated in FIG. 7, formulas, data elements, and data element groupings are represented as icons having different shapes (respectively: triangle, circle, and square). In addition, icons representing different types of data element groupings have different colors, and icons representing different types of data elements also have different colors.

In an embodiment, a system detects when a user selects a particular icon in the dependency graph 700 by clicking on the icon, hovering over the icon, or taking some other action in the user interface indicating selection of a particular icon. Responsive to detecting the selection of the particular icon, the system determines all of the data elements and/or other components that are directly or indirectly related to the component (data element, grouping, or formula) represented by the icon. Direct and indirect relationships are discussed above. The system may call out the related components by highlighting them, changing their color, increasing their size, or otherwise changing their visual appearance in the dependency graph 700. Alternatively or in addition, the system may change the visual appearance of lines connecting the components.

In an embodiment, connectors (e.g., connector 704) indicate the relationships between the different components, with the direction of an arrow indicating the direction of a dependency. An arrow pointing from a first icon to a second icon may indicate either a "uses" or "used by" relationship between the component represented by the first icon and the component represented by the second icon. An arrow from an icon representing a data element to an icon representing a formula may indicate that the data element is used in the formula. An arrow from an icon representing a formula to an icon representing a data element may indicate that the formula is used to compute a value of the data element. Alternatively, the meanings of the directions of arrows may be the reverse of the preceding description. At the zoom level illustrated in FIG. 7, the names of individual data elements are visible. The names and/or shapes associated with data elements may be presented as data element links (e.g., data element link 702). When a user selects a data element link 702, the system may present a GUI with the corresponding data element profile.

5. Data Element Groupings

Figure 8:
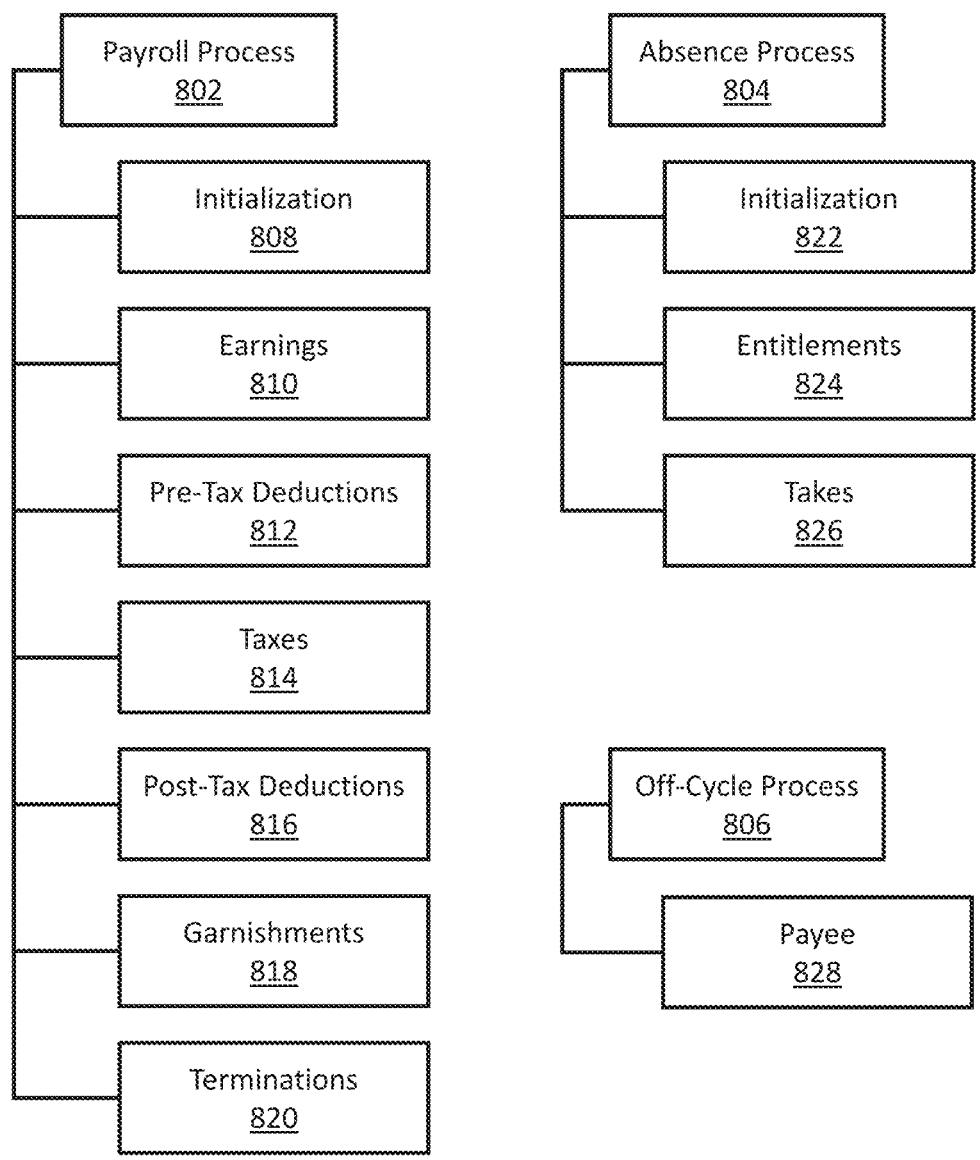
FIG. 8 is a block diagram illustrating an example of data element groupings according to an embodiment.

As discussed above, data elements may be logically arranged into data element groupings. FIG. 8 is a block diagram illustrating an example of data element groupings according to an embodiment. The illustration in FIG. 8 is provided as an example only and should not be construed as limiting one or more embodiments.

As illustrated in FIG. 8, there are two different types of data element groupings: processes and sections. Processes may be used to dictate an order of operations. Sections may be used to group data elements that are logically related, such as data elements that belong to a particular category, data elements that tend to be used in related operations, and/or data elements that bear some other kind of logical relationship to each other. Values of data elements in a particular section may be generated as a group, simultaneously and/or in a particular sequence. Data elements in a particular section may be associated with corresponding sequence numbers, and values of those data elements may be generated in an order indicated by their respective sequence numbers. A value of a particular data element in a section may depend on a previously generated value of a different data element in the same section or in a different section. FIG. 8 illustrates three examples of processes: a payroll process 802, an absence process 804, and an off-cycle process 806. Each process includes one or more sections of data elements. The payroll process 802 includes the sections initialization 808, earnings 810, pre-tax deductions 812, taxes 814, post-tax deductions 816, garnishments 818, and terminations 820. The absence process 804 includes the sections initialization 822, entitlements 824, and takes 826. The off-cycle process 806 includes the section payee 828. Each section includes one or more data elements (not shown).

Figure 9A:
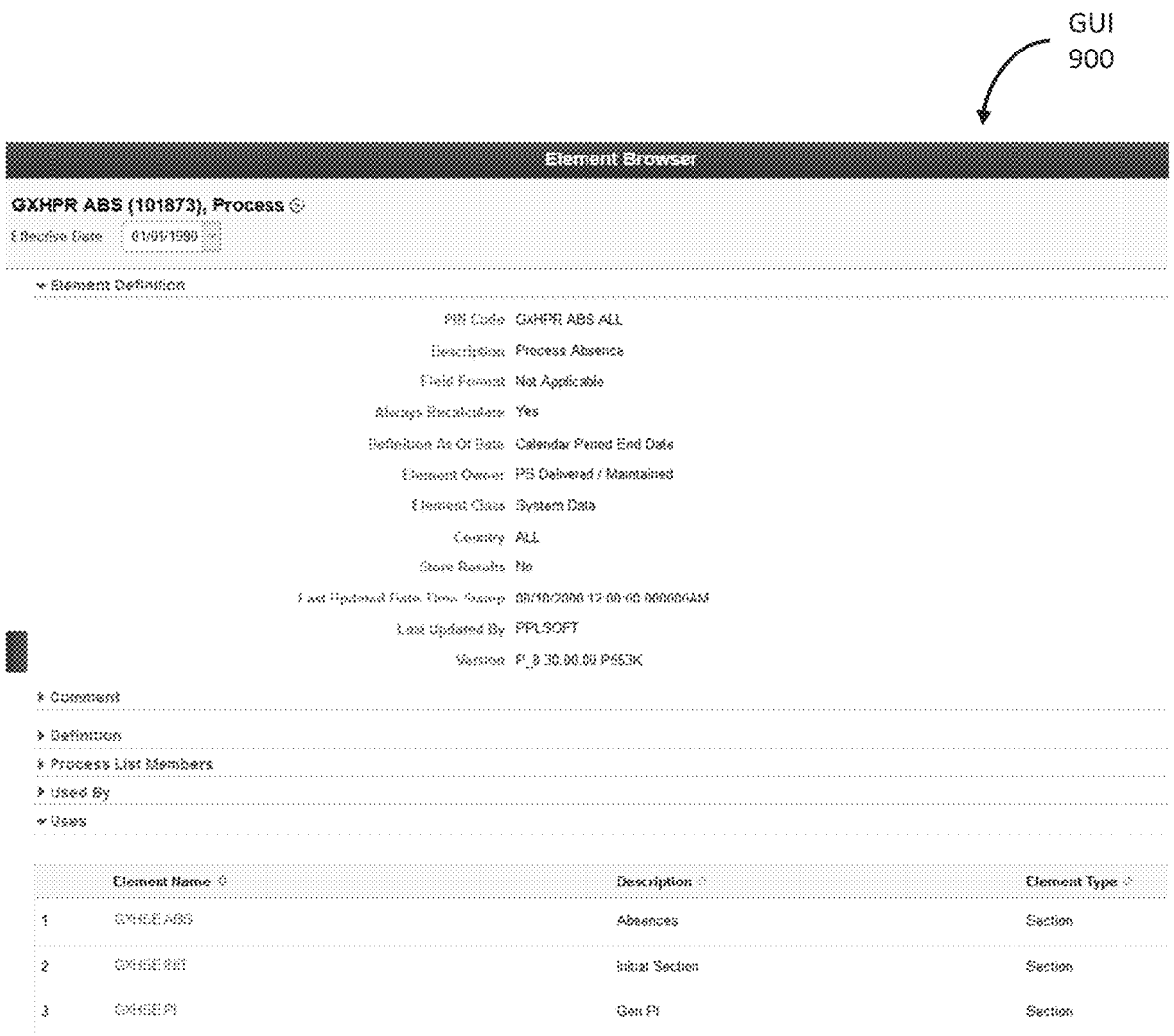
FIGS. 9A-9C illustrate examples of a graphical user interface (GUI) according to an embodiment.
Figure 9B:
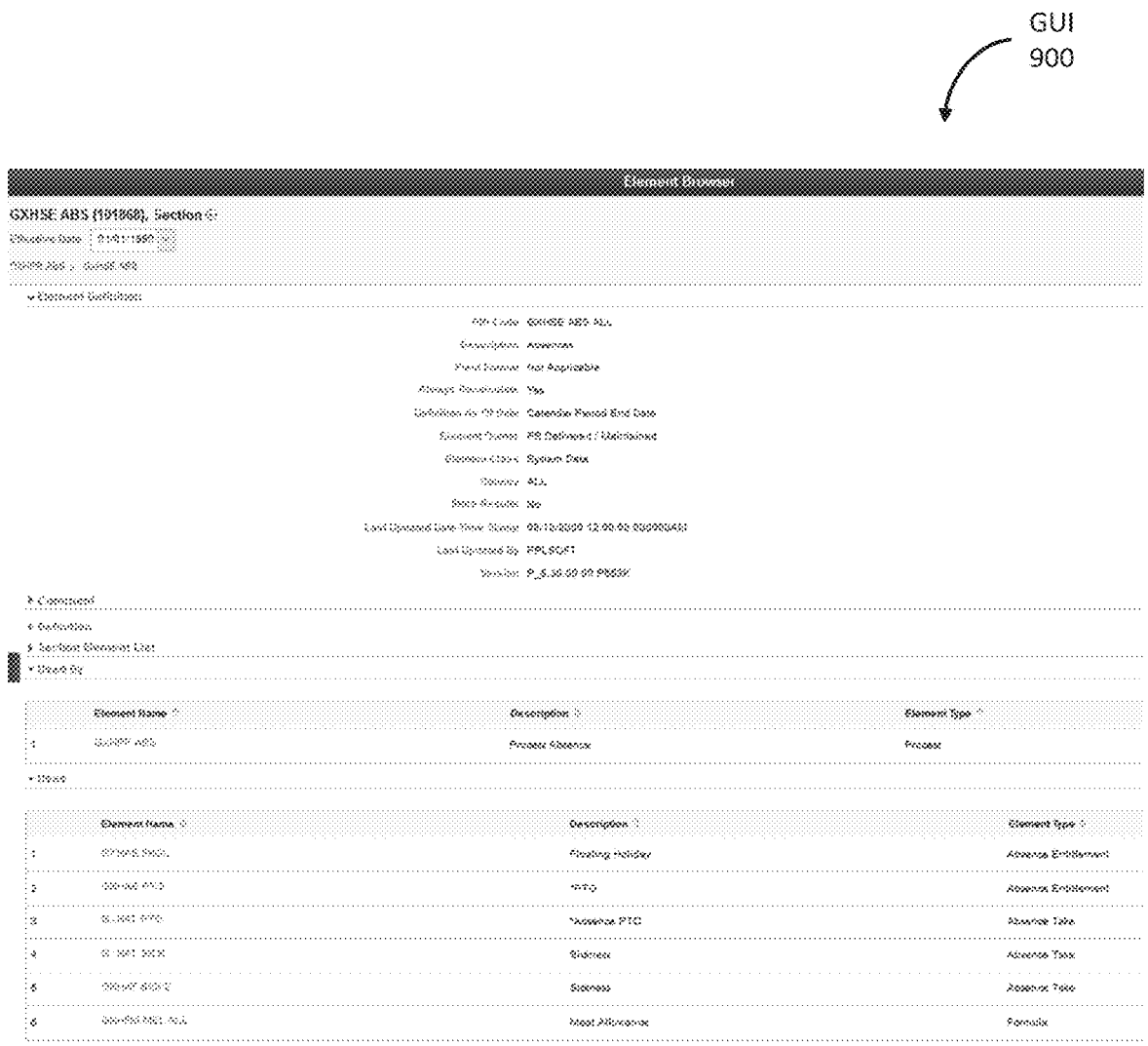
Figure 9C:
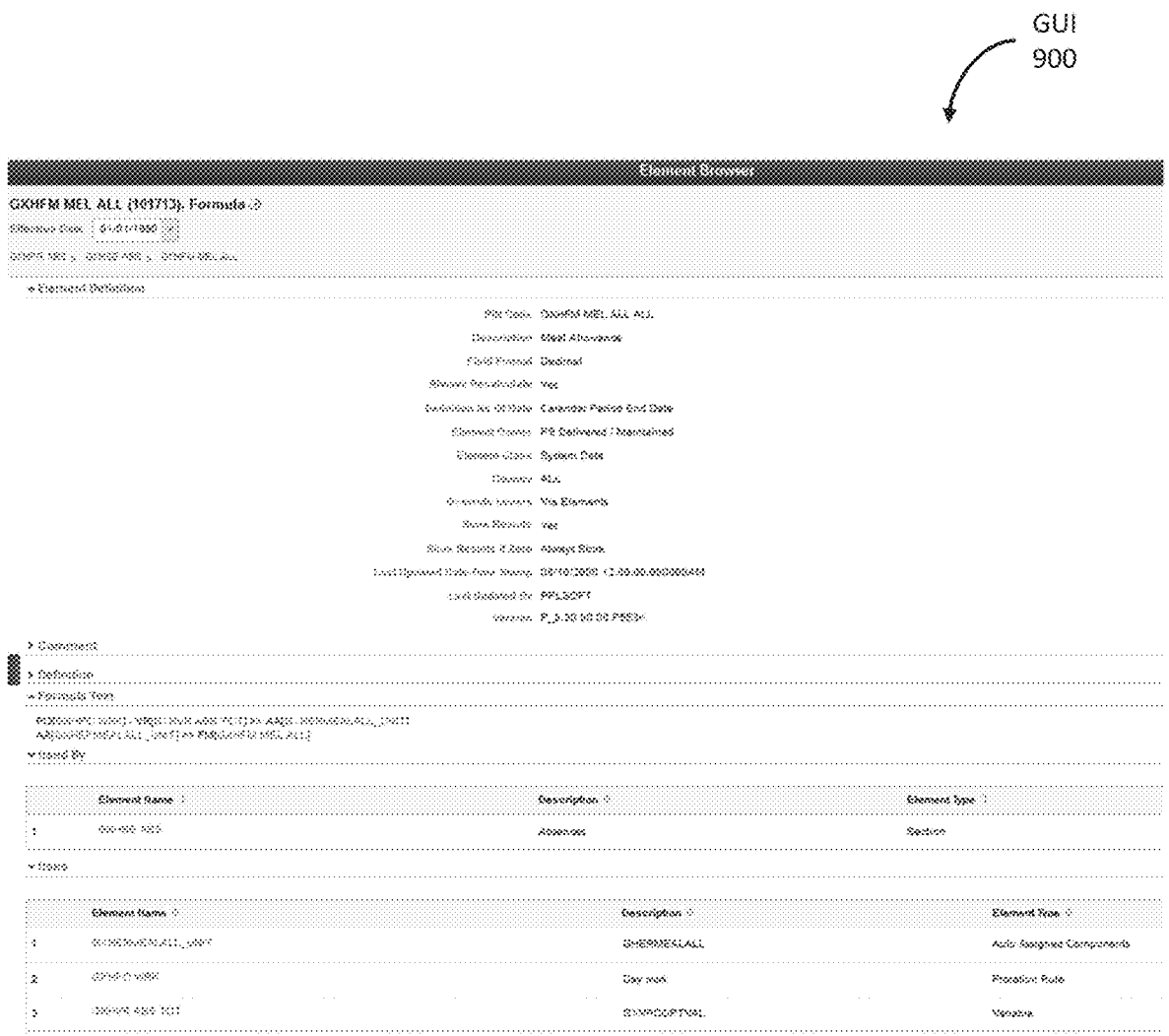

FIGS. 9A-9C illustrate examples of a graphical user interface (GUI) 900 according to an embodiment. The illustrations in FIGS. 9A-9C are provided as examples only and should not be construed as limiting one or more embodiments.

As illustrated in FIG. 9A, the GUI 900 presents information about a process. In this example, the process description ("Process Absence") indicates which process is presented in the GUI 900. In this example, the GUI 900 includes a "Used By" area and a "Uses" area. The "Uses" area lists sections that the process "uses," i.e., sections that are components of the process. In FIG. 9B, the GUI 900 presents information about one of the sections, with the description "Absences." In this example, the GUI 900 includes a "Used By" area and a "Uses Area." The "Used By" area lists the process ("Process Allowance") that includes this section. The "Uses" section lists the data elements that are included in the section. In FIG. 9C, the GUI 900 presents information about one of the data elements in the section, with the description "Meal Allowance." Specifically, the GUI 900 presents a data element profile corresponding to the data element.

As described herein, embodiments allow a user to visually navigate different components that make up application logic in a data management application. Specifically, the application logic is based on relationships between data elements. The relationships may involve formulas indicating that some data elements depend on other data elements or, conversely, that some data elements are components of other data elements. The relationships may include data element groupings. Data elements may be grouped into logically related sections. Alternatively or in addition, data elements may be grouped into processes, where some operations are performed before other operations. A user may visually navigate these relationships, drilling down into the relationship hierarchy or moving up through the relationship hierarchy. The user may also modify the application logic by changing the relationships between data elements. For example, the user may modify a formula and thereby alter the relationship between a data element that uses the formula and another data element that is used by the formula. Embodiments may provide an accessible visual approach to understanding and/or modifying application logic.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 10:
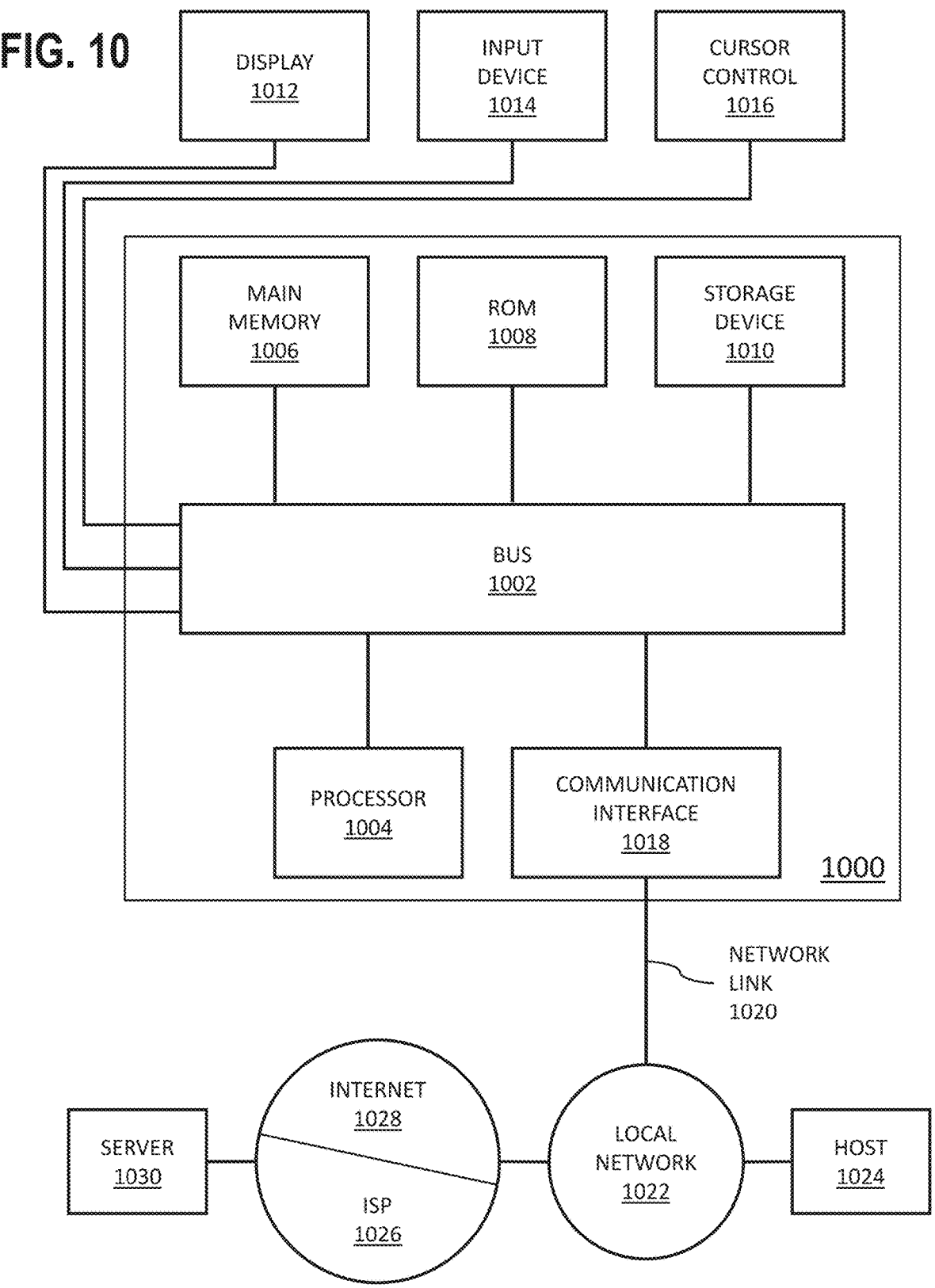
FIG. 10 shows a block diagram that illustrates a computer system in accordance with one or more embodiments.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

8. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

9. Microservice Applications

According to one or more embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HyperText Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In one or more embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to one or more embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In one or more embodiments, a plugged-in microservice application may expose actions to the microservices manager. The exposed actions may receive, as input, data or an identification of a data object or location of data, that causes data to be moved into a data cloud.

In one or more embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In one or more embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, cause performance of operations comprising:
   presenting a first data element profile at least by:
      presenting a first data element as a first component of a plurality of components in the first data element profile, the first data element being one of a plurality of data elements used by an application,
      presenting a second data element as a second component of the plurality of component in the first data element profile, the second data element being another one of the plurality of data elements, and
      presenting a first formula as another component of the plurality of components in the first data element profile, wherein the application is configured to calculate, based on the first formula, at least one value of the first data element using at least one value of the second data element;
   detecting a first user input selecting the second data element in the first data element profile;
   presenting, based on detecting the first user input, a second data element profile at least by:
      presenting the second data element as a first component of a plurality of components in the second data element profile, the second data element being one of a plurality of data elements used by an application,
      presenting a third data element as a second component of the plurality of component in the second data element profile, the third data element being another one of the plurality of data elements, and
      presenting a second formula as another component of the plurality of components in the second data element profile, wherein the application is further configured to calculate, based on the second formula, at least one value of the second data element using at least one value of the third data element;
   detecting a second user input selecting the third data element in the second data element profile; and
   presenting, based on detecting the second user input, a third data element profile comprising the third data element.

2. The medium of claim 1, wherein presenting the first data element profile further comprises:
   presenting a fourth data element as a third component of the plurality of components in the first data element profile of the plurality of data elements used by the application, and
   wherein the application is further configured to calculate, based on a third formula, at least one value of the fourth data element using at least one value of the first data element.

3. The medium of claim 2, wherein the operations further comprise:
   detecting a third user input selecting the fourth data element in the first data element profile; and
   presenting, based on detecting the third user input, a fourth data element profile comprising:
      the first data element,
      the fourth data element, and
      the third formula.

4. The medium of claim 3, wherein the first data element is selectable in the fourth data element profile to present the first data element profile.

5. The medium of claim 1, wherein the operations further comprise:
   presenting a dependency graph comprising:
      a first visual representation of the first data element,
      a second visual representation of the second data element,
      a third visual representation of the third data element,
      a first connector, based on the first formula, indicating a first dependency of the first data element on the second data element, and
      a second connector, based on the second formula, indicating a second dependency of the second data element on the third data element.

6. The medium of claim 1, wherein the first user input comprises a click on a hyperlink representing the second data element.

7. The medium of claim 1, wherein the application is a payroll administration application.

8. The medium of claim 1, wherein at least two data elements in the plurality of data elements have different data element types.

9. The medium of claim 1, wherein the operations further comprise:
   receiving a search term;
   applying the search term to the plurality of data elements to obtain a search result comprising the first data element; and
   detecting a third user input selecting the first data element in the search result, wherein presenting the first data element profile is performed responsive to detecting the third user input.

10. The medium of claim 9, wherein the search result further comprises a different data element having a different data element type than the first data element.

11. The medium of claim 1, wherein the presenting the first formula comprises presenting editable code.

12. The medium of claim 1, wherein the third data element profile further comprises a data element viewing history, the data element viewing history being selectable in a first location to present the first data element profile and selectable in a second location to present the second data element profile.

13. The medium of claim 1, wherein the second data element profile further comprises historical data associated with a plurality of instances of calculating at least one value of the first data element using at least one value of the second data element.

14. A system comprising:
one or more hardware processors; and
one or more one or more non-transitory computer-readable media storing instructions, which when executed by the one or more hardware processors, cause execution of operations comprising:
presenting a first data element profile at least by:
presenting a first data element as a first component of a plurality of components in the first data element profile, the first data element being one of a plurality of data elements used by an application,
presenting a second data element as a second component of the plurality of component in the first data element profile, the second data element being another one of the plurality of data elements, and
presenting a first formula as another component of the plurality of components in the first data element profile, wherein the application is configured to calculate, based on the first formula, at least one value of the first data element using at least one value of the second data element;
detecting a first user input selecting the second data element in the first data element profile;
presenting, based on detecting the first user input, a second data element profile at least by:
presenting the second data element as a first component of a plurality of components in the second data element profile, the second data element being one of a plurality of data elements used by an application,
presenting a third data element as a second component of the plurality of component in the second data element profile, the third data element being another one of the plurality of data elements, and
presenting a second formula as another component of the plurality of components in the second data element profile, wherein the application is further configured to calculate, based on the second formula, at least one value of the second data element using at least one value of the third data element;
detecting a second user input selecting the third data element in the second data element profile; and
presenting, based on detecting the second user input, a third data element profile comprising the third data element.

15. A non-transitory computer readable medium comprising instructions which, when executed by one or more hardware processors, cause performance of operations comprising:
determining that an application is configured to calculate, based on a first formula, at least one value of a first data element of a plurality of elements, using at least one value of a second data element of the plurality of data elements;
determining that the application is configured to calculate, based on a second formula, at least one value of the second data element of the plurality of elements, using at least one value of a third data element of the plurality of data elements; and
presenting a dependency graph, the presenting comprising:
presenting a first visual representation of the first data element,
presenting a second visual representation of the second data element,
presenting a third visual representation of the third data element,
presenting a first connector, based on the first formula, indicating a first dependency of the first data element on the second data element, and
presenting a second connector, based on the second formula, indicating a second dependency of the second data element on the third data element.

16. The medium of claim 15, wherein visual representations of data elements in the dependency graph have different appearances corresponding to different types of data elements.

17. The medium of claim 15, wherein the operations further comprise:
detecting a first user input for zooming in on the dependency graph,
wherein zooming in comprises presenting, in the dependency graph, more detailed information about the first data element.

18. The medium of claim 15, wherein the operations further comprise:
detecting a first user input for zooming out on the dependency graph,
wherein zooming out comprises presenting, in the dependency graph, operational context for the first data element, the second data element, and the third data element.

19. The medium of claim 18, wherein presenting operational context comprises presenting, in the dependency graph, more data elements of the plurality of data elements.

20. The medium of claim 18, wherein presenting operational context comprises identifying, in the dependency graph, a functional unit of the application for which the first data element, the second data element, and the third data element are used.

21. A non-transitory computer readable medium comprising instructions which, when executed by one or more hardware processors, cause performance of operations comprising:
presenting a first data profile object as a first hierarchical rendering of a plurality of data elements in the first data profile object and a plurality of relationships between the plurality of data elements, the first hierarchical rendering comprising:
presenting a first plurality of selectable icons at a first level of the first hierarchical rendering, the icons at the first level representing a first set of data elements of the plurality of data elements;
presenting a second plurality of selectable icons at a second level of the first hierarchical rendering, the icons at the second level representing a second set of data elements of the plurality of data elements;
presenting a third plurality of selectable icons connecting at least one selectable icon of the first plurality of selectable icons to at least one selectable icon of the second plurality of selectable icons, wherein the third plurality of selectable icons represents a formula defining a relationship by which a value associated with the at least one selectable icon of the first plurality of selectable icons is based on a value associated with the at least one selectable icon of the second plurality of selectable icons;
wherein selecting a selectable icon of the second plurality of selectable icons further causes performance of operations comprising:

presenting a second data profile object as a second hierarchical rendering comprising the selected icon at a first level of the second hierarchical rendering;

presenting a fourth plurality of selectable icons at a second level of the second hierarchical rendering; and presenting a fifth plurality of selectable icons connecting at least some of the fourth plurality to the selected icon at the first level.

* * * * *

UNITED STATES PATENT AND TRADEMARK OFFICE
CERTIFICATE OF CORRECTION

PATENT NO. : 11,216,479 B2
APPLICATION NO. : 15/801434
DATED : January 4, 2022
INVENTOR(S) : Mukherjee et al.

It is certified that error appears in the above-identified patent and that said Letters Patent is hereby corrected as shown below:

On the Title Page

In Column 1, under (72) Inventors, Lines 2-3, delete "Karnatak (IN)" and insert -- Karnataka (IN) --, therefor.

In Column 1, under (72) Inventors, Line 7, delete "Neubiber (DE)" and insert -- Neubiberg (DE) --, therefor.

In the Specification

In Column 1, Line 3, below "INTERFACE" insert -- BENEFIT CLAIMS; INCORPORATION BY REFERENCE --, therefor.

In the Claims

In Column 23, Line 6, in Claim 14, delete "one or more one or more" and insert -- one or more --, therefor.

Signed and Sealed this
Twenty-fourth Day of May, 2022

Katherine Kelly Vidal
*Director of the United States Patent and Trademark Office*